(12) United States Patent
Park et al.

(10) Patent No.: US 6,219,620 B1
(45) Date of Patent: Apr. 17, 2001

(54) SEISMIC ACQUISITION SYSTEM USING WIRELESS TELEMETRY

(75) Inventors: William Pentland Park; John Grant Flavell Smith; John Christopher Whelan; David James Hamilton; William Alan Sandham, all of Stirling (GB)

(73) Assignee: Vibration Technology Limited, Stirling (GB)

(*) Notice: Subject to any disclaimer, the term of this patent is extended or adjusted under 35 U.S.C. 154(b) by 0 days.

(21) Appl. No.: 09/297,159

(22) PCT Filed: Oct. 23, 1997

(86) PCT No.: PCT/GB97/02924

§ 371 Date: Jun. 16, 1999

§ 102(e) Date: Jun. 16, 1999

(87) PCT Pub. No.: WO98/18022

PCT Pub. Date: Apr. 30, 1998

(30) Foreign Application Priority Data

Oct. 23, 1996 (GB) .................................................. 9622044
Jul. 30, 1997 (GB) .................................................. 9715967

(51) Int. Cl.[7] ...................................................... G01V 1/22
(52) U.S. Cl. ............................................................. 702/14
(58) Field of Search ..................................... 702/14, 15, 6; 367/76, 77

(56) References Cited

U.S. PATENT DOCUMENTS

| 3,886,494 | 5/1975 | Kostelnicek et al. | 340/15.5 |
| 4,815,044 | 3/1989 | Deconincck et al. | 367/77 |
| 5,276,655 | * 1/1994 | Rialan et al. | 367/77 |
| 5,563,847 | 10/1996 | Grouffal et al. | 367/65 |
| 5,724,241 | * 3/1998 | Wood et al. | 702/14 |
| 5,822,273 | 10/1998 | Bary et al. | 367/77 |

FOREIGN PATENT DOCUMENTS 195 19 164 A1    12/1995   (DE) .
0 646 809 A1      4/1995   (EP) .

* cited by examiner

Primary Examiner—Donald E. McElheny, Jr.
(74) Attorney, Agent, or Firm—Ratner & Prestia

(57) ABSTRACT

A seismic acquisition system divides a survey terrain into a number of cells (14) each containing a cell access node (16) and a number of geophone units (10). The geophone units (10) transmit data in digital form to the respective cell access node (16) by wireless telemetry, and the cell access nodes (16) forward the data to a central control (12) by broadband channels.

15 Claims, 4 Drawing Sheets

SEISMIC ACQUISITION SYSTEM USING WIRELESS TELEMETRY

This application is the U.S. national phase application of PCT International Application No. PCT/GB97/02924 filed 23 Oct. 1997.

This invention relates to seismic acquisition using geophones.

It is well known to conduct a geophysical survey of a land area by using an array of geophones in conjunction with either a succession of explosions or a continuous vibration applied to the ground by a vibratory apparatus.

Although the results obtained are valuable, conventional techniques are logistically slow, labour intensive, and costly. It is necessary to deploy a large number of geophones on a grid which has been previously surveyed. Each geophone string is individually wired to a central control unit. As the survey progresses, geophones in the rear must be disconnected, repositioned at the front, and reconnected. This procedure is extremely laborious, and the complexity of the connections gives a high probability of error. The scale of the problem will be understood when it is realised that a typical 3D seismic array involves up to 750 km of cabling.

An object of the present invention is to provide a means to simplify these procedures, and thus to reduce the time and cost of the survey by a significant factor.

Accordingly, the invention from one aspect provides a seismic acquisition system comprising a multiplicity of a geophone units which, in use, are arranged in an array across a survey terrain; each geophone unit comprising means for deriving digital data representative of seismic movement of the earth's surface at the geophone location, and wireless telemetry means adapted to receive command signals from a central control and to transmit said digital data to the central control on command.

In a preferred form of the invention, the terrain is divided into a number of cells each of which contains a number of geophone units and a cell access node. The geophone units in a given cell communicate with the respective cell access node using wireless telemetry at a given frequency, with different frequencies used in adjacent cells.

The cell access nodes may communicate with the central control by radio, or by cable or fibre optic link.

The communication within each cell is preferably high frequency (most preferably 2.4 GHz band) low power. This permits a limited number of frequencies to be re-used across the terrain.

The means for deriving said digital data may comprise an analog geophone measuring velocity, coupled to an analog-to-digital converter.

Each of the geophone units is preferably provided with a memory for short term storage of said data, and for permanent storage of a unique code identifying that geophone unit.

Preferably, each of the geophone units has a preamplifier and preamplifier control means remotely operable from the central control. The preamplifier control means may be operable to control the gain and/or an operating time window of the preamplifier as a function of the distance of that geophone unit from the location of the seismic signal source being monitored, and/or as a function of time.

Each of the geophone units may additionally have its unique code physically embodied internally or externally, or electronically tagged on a microprocessor forming part of the geophone unit, or as an external display for example in the form of a machine readable bar code, all of which can be read by wireless method using existing hardware.

The wireless telemetry means is preferably digital, and may comprise a dedicated wireless system, or may be provided by a cellular wireless system.

From another aspect, the invention provides a method of conducting a seismic survey in which a number of geophone units are positioned in an array across a terrain of interest, a seismic signal (or a series of seismic signals) is generated to produce seismic data collected by the geophone units, the data for each geophone unit is stored at the geophone unit, and said data is transferred to a central location using wireless telemetry, at the same time or at a later time.

An embodiment of the present invention will now be described, by way of example only, with reference to the drawings, in which.

Figure 1:
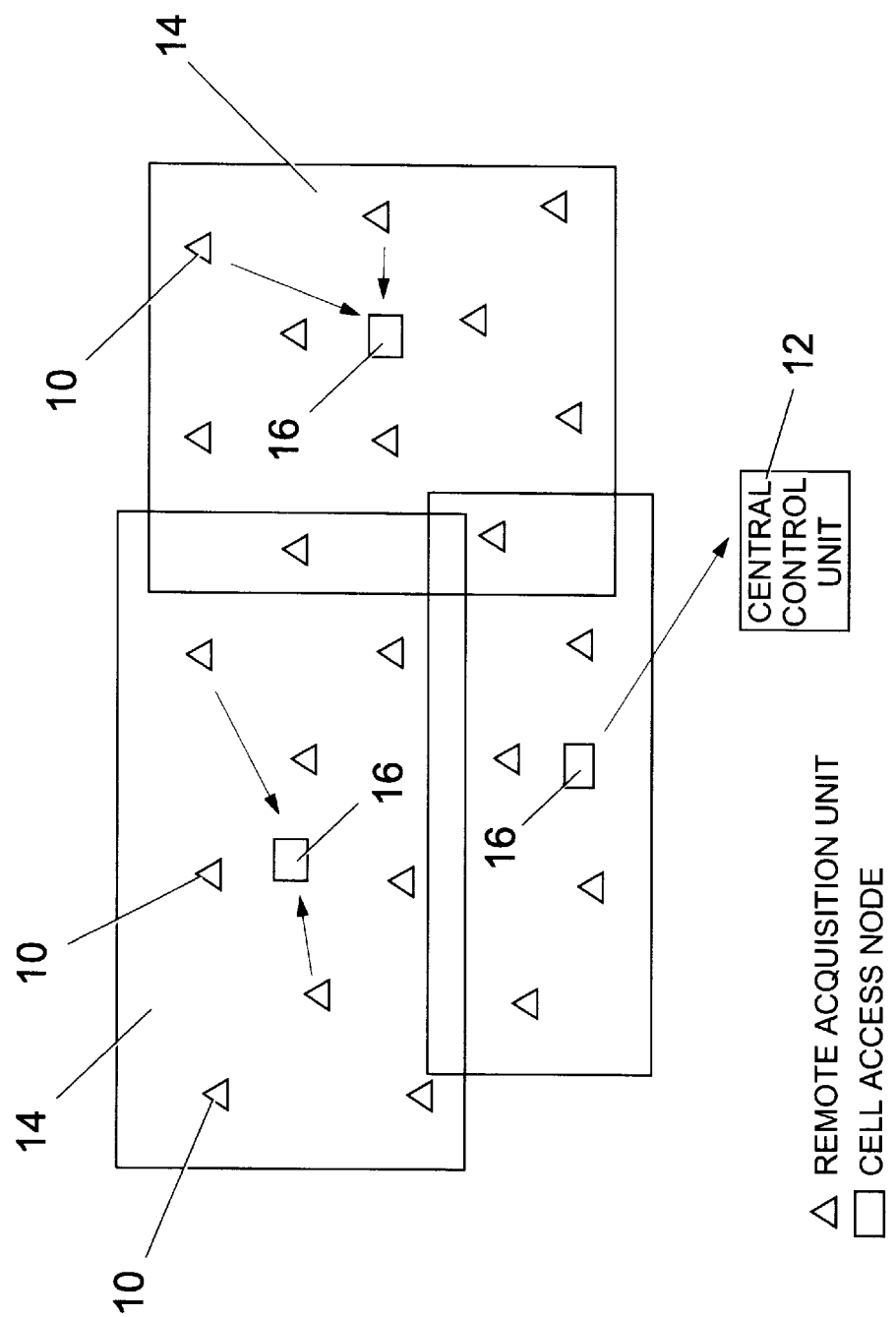
FIG. 1 is a schematic view of a seismic survey system.

Referring to FIG. 1, a seismic survey across a "prospects" or area of terrain of interest is conducted by positioning a number of geophone units or remote acquisition units (RAUs) 10 at known locations, typically in a regular array. In the system of the present invention, each RAU 10 can receive signals from and transmit signals to a central control unit (CCU) 12 using wireless telemetry.

The array may be divided up into cells as indicated at 14 each with a transmitter/receiver or cell access node (CAN) 16 acting as a relay between the RAUs 10 and the CCU 12. This division may be required by the nature of the terrain, but is advantageous in any event since it allows the use of low power in the RAUs 10, thus reducing size and cost.

Figure 2:
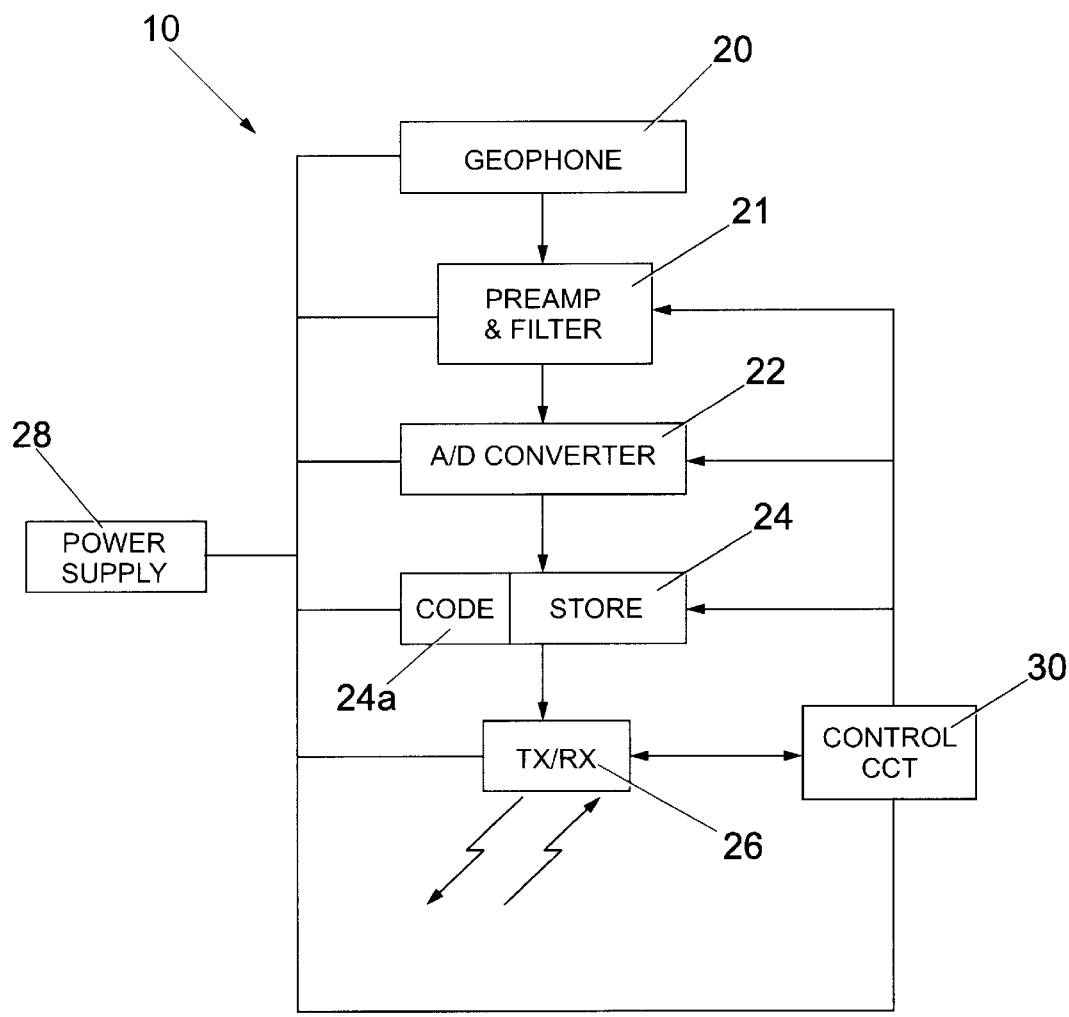
FIG. 2 is a block diagram illustrating one form of geophone unit for use in the system.

FIG. 2 illustrates an individual RAU 10 which may be used in the system of FIG. 1. The RAU 10 in FIG. 2 uses a single conventional geophone or string(s) of geophones to provide velocity information at 20 in analogue form to an analogue to digital convertor 22 via a preamplifier and filter stage 21. The digitised information is stored at 24 for forwarding to the CAN 16 via a transmitter/receiver 26 in accordance with control signals received from the CAN 16. These control signals and the forwarding of the digital information are by means of any suitable proprietary protocol.

The RAU 10 also comprises a power supply 28 and control circuitry 30. The power supply 28 suitably comprises rechargeable or disposable batteries and preferably also a solar panel.

Each of the RAUs 10 is identified by a unique code which may be stored in a dedicated area of the store 24 as indicated at 24a.

The control circuitry 30 controls operation of the preamplifier 21 in two ways.

First, the gain of the preamplifier 21 is adjusted as a function of distance of the particular RAU 10 from the location of the seismic signal source; this provides more sensitivity at further distance from the source. This adjustment may suitably be made and changed as the location of the source is changed, the RAUs being stationary.

Secondly, the gain may also be varied with time as the return from the seismic signal source decays, with more preamplification being used to boost the signal as it decays. For example, an RAU close to the seismic signal source could be set to have an initial gain of $2^0$ which is used for the first second of the signal and is increased to $2^1$, $2^2$ and $2^3$ for each successive second, whereas a distant RAU may be set with an initial gain of $2^4$, increasing to $2^5$, $2^6$ and $2^7$.

These two factors are programmable from the CCU 12.

The control circuitry 30 also controls the operation of the digital wireless telemetry such that the power output is variable, allowing the number of RAUs 10 reporting to any given CAN 16 and the distance of any RAU 10 from any given CAN 16 to be programmed, allowing the design of the seismic surveys to be flexible. These factors are also programmable from the CCU 12.

In operation, the CCU 12 transmits a signal to indirectly activate the RAUs 10 prior to initiation of the seismic signal source and each unit then stores data for a given period after that signal. The CANs 16 poll their respective RAUs 10 causing each RAU to transmit its stored information preceded by its identity code. By using different frequencies in the various cells 14, polling can proceed simultaneously in each cell, with the CANs 16 communicating with the CCU 12 via a small number of broadband wireless links, or data cable or fibre optic links.

In a modification, RAUs may be used which each comprise two or more geophones operating with a single memory, control circuitry and transmitter/receiver.

The shape and size of the cells is determined by the range of the wireless transceiver, the terrain, obstructions, and to a lesser extent the weather. The RAUs in a given cell operate on one set of radio frequencies. Adjacent cells operate on different frequencies.

Figure 3:
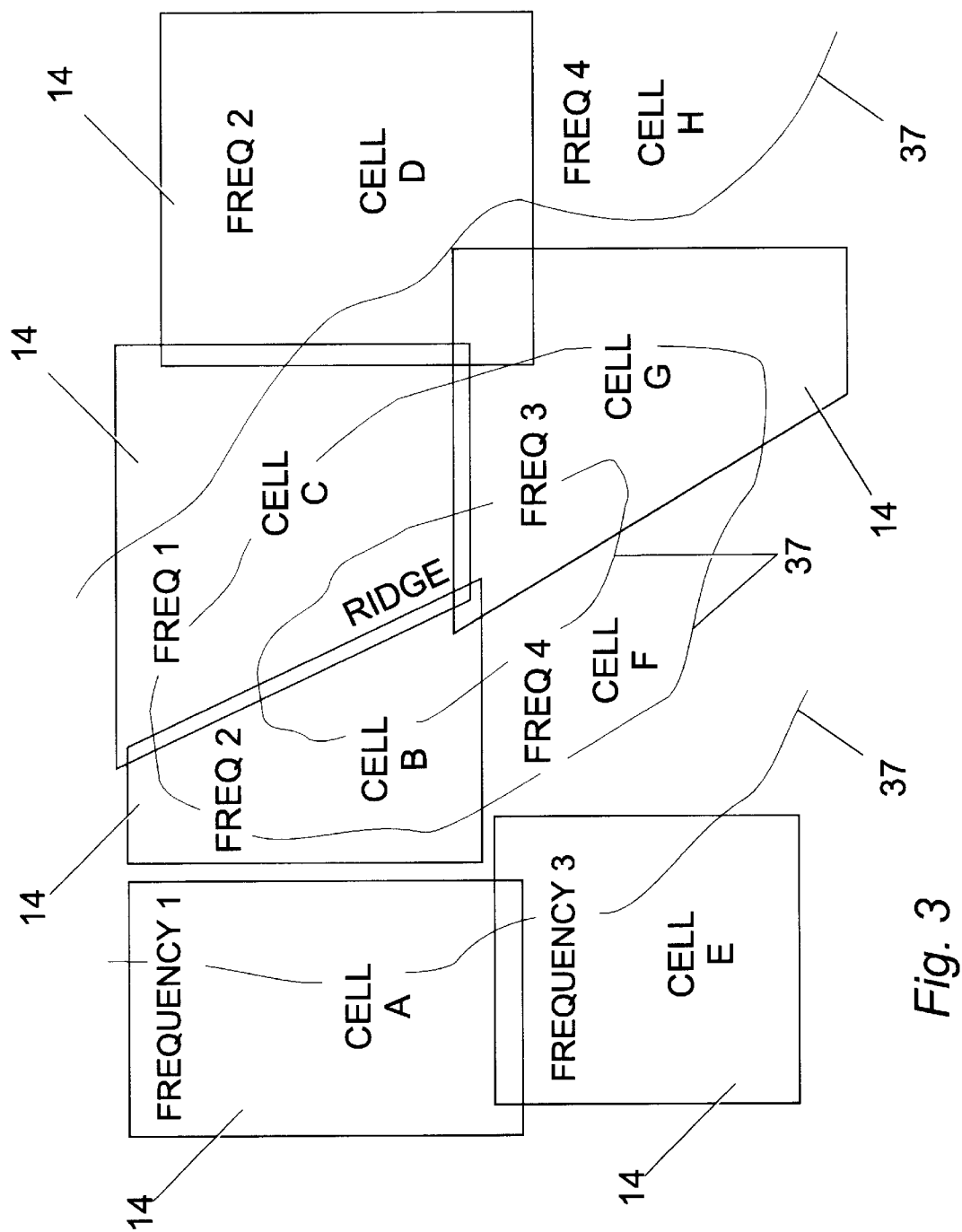
FIG. 3 is a schematic view of a survey area illustrating radio frequency allocation.

The telemetry system is able to re-use frequencies in non-adjacent cells. FIG. 3 illustrates this with reference to a survey area crossing a ridge (indicated by contour lines 37). Given that the radio transceivers have a limited range, once outside that range a given frequency can be re-used in another cell. Thus radio frequencies can be re-used on a rolling basis to minimise the number of frequencies required by the system.

The radio system may particularly operate in the 2.4 GHz band at low power. High frequencies of this order decay quickly with increasing distance, which allows a limited number of frequencies to be used for an unlimited number of cells. The 2.4 GHz band is particularly preferred as this is a licence-free band in many territories.

In the event of a CAN receiving signals from a number of different cells, the system software can de-duplicate the signals by deleting the weaker signals.

A suitable resolution will be obtained by each geophone generating 24-bit information at a repetition rate of 500 Hz (2 ms sample rate). The bandwidth requirement of the polling system may be reduced by using known data compression techniques in the RAUs 10 or CANs 16.

As one example, for a 24-bit sample at 2 ms intervals, the maximum data rate per geophone unit would be 12 kbits/s, and for a sector with eighty geophone units, the sector base station would have a maximum data rate of 1 Mbits/s. There are available low cost radiotelemetry modules suitable for this data rate; for example, the "fPrism" radio chipset from Harris Semiconductor Limited can handle up to 4 Mbit/s.

Figure 4:
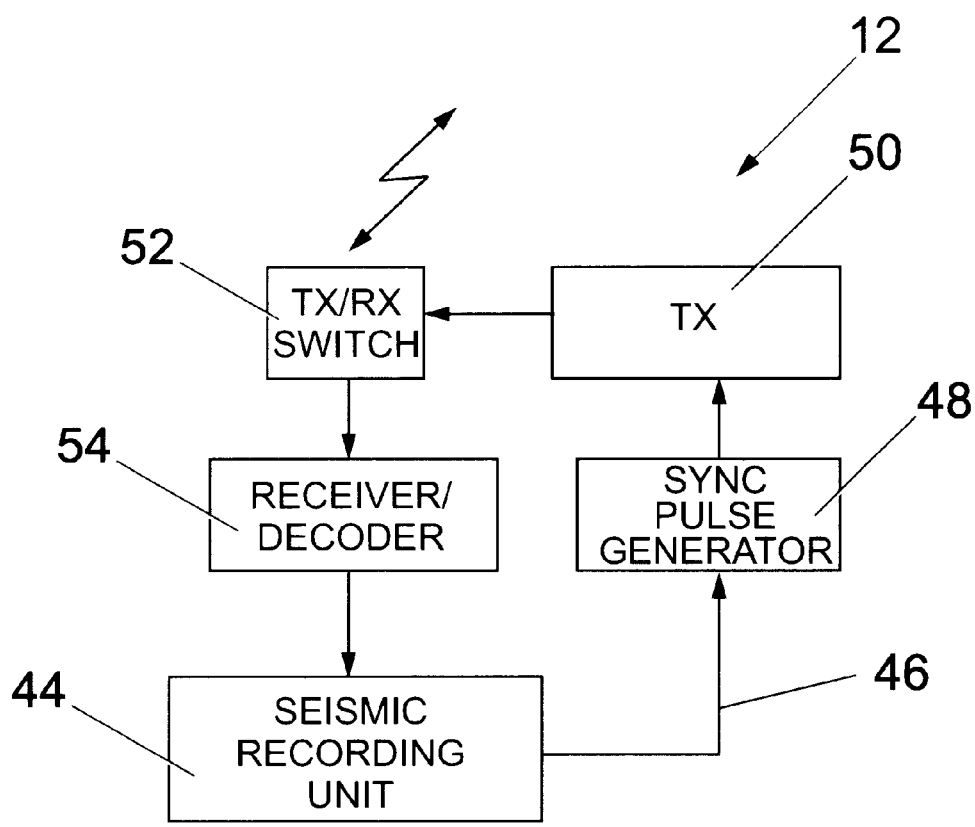
FIG. 4 is a block diagram of a central control used in the system.

FIG. 4 shows one suitable form of CCU. Data is captured on a commercially available seismic acquisition recording unit 44 of known type. This issues timed shot commands a t 46. Each shot command causes a sync pulse generator 48 to generate a sync pulse 1 to activate the geophones, and a series of timed sync pulses $2_i$ to control the polling. The sync pulses are encoded and transmitted at 50 via a transmit/receive switch 52, which also gates incoming data signals to a receiver and decoder 54 to supply data for the recording unit 44.

In a modification of the CCU, the sampling interval is reduced stepwise in time. As one example, instead of sampling every 2 ms for a total of 4 s, the sampling rate would be every 2 ms for the first second, every 4 ms for the next second, every 6 ms for the third second, and every 8 ms for the fourth second. The reason for this is that high frequency information is attenuated with time in comparison with low frequency information, and therefore the further one is away in time from the input event the less high frequency there is to be measured and the sampling rate can be reduced.

It is of course necessary for the CCU 12 to have information defining the position of each of the RAUs 10. This may be achieved, as is currently done with wired systems, by securing the RAUs 10 at positions previously marked by conventional surveying. To assist in loading information defining which RAU is at which location, each RAU may conveniently be provided with an external machine-readable label such as a conventional bar code with that unit's unique identity code. The personnel installing the units can thereby enter the location number and the corresponding geophone code in a simple manner into portable recording apparatus for a subsequent downloading into the central control 12.

As an alternative, each RAU could include an electronic positioning means which would enable the RAUs to be positioned on the terrain without a preliminary survey with the position of each RAU thereafter being established by the CCU 12 by polling location data from the RAUS 10. Such electronic positioning means could be provided by a GPS system. Positional accuracy can be improved by use of Differential GPS (DGPS). Rather than incurring the expense of DGPS in each RAU, since the RAUs are at fixed locations the positional information can be loaded into the RAU when it is installed; conveniently this could be done by infra-red, radio or any other suitable means of short range data transfer linking from a portable DGPS apparatus which also includes the bar code reader.

Alternatively, the position of the CAN for each cell could be fixed by a GPS receiver in the CAN, and the relative position of each RAU with respect to its CAN determined by a relatively simple local system.

It is likely that a dedicated wireless telemetry system would require to be used, with one frequency to carry commands from the CCU 12 indirectly to the various RAUs 10 and a number of separate frequencies to carry data in reverse. In certain locations however it might be possible to use systems similar to cellular telephones for both commands and data.

Other modifications and improvements may be made to the foregoing within the scope of the present invention, as defined in the following claims.

What is claimed is:

1. A method of conducting a seismic survey, wherein a multiplicity of geophone units are positioned in an array across a terrain of interest, said terrain being divided into cells each of which contains a plurality of said geophone units and a cell access node; a series of seismic signals is generated to produce seismic data collected by said geophone units; the data for each of said geophone units is stored in digital form at said geophone unit; and said data is transferred, at the same time or at a later time, to its respective cell access node in digital form by wireless telemetry at a frequency which is common to all geophone units in that cell, and is transferred from each cell access node to a central location by radio, by cable, or by fibre optic link.

2. A seismic acquisition system comprising:
a central control unit;

a multiplicity of geophone units arranged in an array across a survey terrain;

said survey terrain being divided into a number of cells, each of which contains a plurality of said geophone units and a cell access node;

each of said geophone units comprising means for deriving digital data representative of seismic movement of the earth's surface at the geophone location, and further comprising wireless telemetry means adapted to receive command signals from the central control unit via the respective cell access node and to transmit said digital data on demand to the respective cell access node for onward transmission to the central control unit;

and in which said plurality of geophone units within a given cell communicate with said cell access node using said wireless telemetry at a given frequency, different frequencies are used in adjacent cells, and each frequency is used in a number of non adjacent cells across the terrain.

3. A seismic acquisition system comprising:

a central control unit;

a multiplicity of geophone units arranged in an array across a survey terrain;

said survey terrain being divided into a number of cells, each of which contains a plurality of said geophone units and a cell access node;

each of said geophone units comprising means for deriving digital data representative of seismic movement of the earth's surface at the geophone location, and further comprising wireless telemetry means adapted to receive command signals from the central control unit via the respective cell access node and to transmit said digital data on demand to the respective cell access node at a frequency which is common to all geophone units in that cell for onward transmission to the central control unit;

and in which each of the geophone units includes a preamplifier and preamplifier controls means, the preamplifier control means being operable to control at least one parameter of the preamplifier selected from gain and an operating time window, said parameter being controlled as a function of at least one second parameter selected from (a) the location of the seismic source being monitored, and (b) time.

4. A seismic acquisition system comprising a multiplicity of geophone units arranged in an array across a survey terrain; wherein each said geophone unit comprises means for deriving digital data representative of seismic movement of the earth's surface at the geophone location; wherein each of said geophone units further comprises wireless telemetry means adapted to receive command signals from a central control and to transmit said digital data on demand, the transmitted digital data passing to said central control by a communication channel which is at least partially wireless; and wherein said survey terrain is divided into a number of cells each of which contains a plurality of geophone units and a cell access node, the geophone units in each cell communicating with the respective cell access node by wireless telemetry using a single frequency per cell, and the cell access nodes communicating with the central control.

5. A seismic acquisition system as claimed in claim 4, wherein different frequencies are used in adjacent cells.

6. A seismic acquisition system as claimed in claim 5, wherein said communication within each cell is high frequency (2.4 GHz band) low power.

7. A seismic acquisition system as claimed in claim 5, in which a given frequency is used in a number of non-adjacent cells across the terrain.

8. A seismic acquisition system as claimed in claim 5, wherein said communication within each cell is high frequency (2.4 GHz band) low power.

9. A seismic acquisition system as claimed in claim 4, wherein said cell access nodes communicate with said central control by radio, by cable, or by fibre optic link.

10. A seismic acquisition system as claimed in claim 4, wherein said means for deriving digital data comprises an analog geophone measuring velocity, coupled to an analog-to-digital convertor.

11. A seismic acquisition system as claimed in claim 4, wherein said geophone units are provided with a memory for short term storage of said data, and for permanent storage of a unique identification code.

12. A seismic acquisition system as claimed in claim 11, wherein each of said geophone units has its own unique code physically embodied internally, or externally, or electronically tagged on a microprocessor forming part of said geophone units, or as an external display such as bar code.

13. A seismic acquisition system as claimed in claim 4, wherein each of said geophone units has a preamplifier and preamplifier control means.

14. A seismic acquisition system as claimed in claim 13, wherein said preamplifier control means is operable to control the gain and/or an operating time window of said preamplifier as a function of the distance of said geophone unit from the location of the seismic signal source being monitored, and/or as a function of time.

15. A seismic acquisition system as claimed in claim 4, wherein said wireless telemetry means is digital.

* * * * *